(12) United States Patent
Marsh

(10) Patent No.: US 8,739,730 B2
(45) Date of Patent: Jun. 3, 2014

(54) APPARATUS FOR AND A METHOD OF DETERMINING CONDITION OF HOT MELT ADHESIVE FOR BINDING OF A PERFECT BOUND BOOK

(76) Inventor: Jeffrey D. Marsh, Foristell, MO (US)

( * ) Notice: Subject to any disclaimer, the term of this patent is extended or adjusted under 35 U.S.C. 154(b) by 575 days.

(21) Appl. No.: 12/970,552

(22) Filed: Dec. 16, 2010

(65) Prior Publication Data
US 2011/0159170 A1 Jun. 30, 2011

Related U.S. Application Data

(60) Provisional application No. 61/287,484, filed on Dec. 17, 2009.

(51) Int. Cl.
*B05C 3/08* (2006.01)
*B42C 9/00* (2006.01)

(52) U.S. Cl.
USPC .............. 118/400; 118/422; 118/429; 412/37

(58) Field of Classification Search
USPC ......... 118/663, 666, 667, 688, 694, 679–681, 118/708, 712, 258, 400, 427, 429; 427/207.1, 211, 428.01–428.21; 412/37, 33; 366/241, 279, 601, 348, 366/349
See application file for complete search history.

(56) References Cited

U.S. PATENT DOCUMENTS

| | | | |
|---|---|---|---|
| 1,076,726 A | 10/1913 | Welch | |
| 1,088,573 A | 2/1914 | Heldmann | |
| 1,635,165 A | 7/1927 | Adamsky | |
| 1,704,454 A | 3/1929 | Ackley | |
| 1,757,623 A | 5/1930 | Frazier | |
| 1,801,374 A * | 4/1931 | Stock | 118/712 |
| 1,935,646 A * | 11/1933 | Luthi | 118/429 |
| 2,895,148 A | 7/1959 | Hildmann | |
| 2,971,461 A * | 2/1961 | Bradford et al. | 101/216 |
| 3,093,396 A | 6/1963 | Segreto | |

(Continued)

FOREIGN PATENT DOCUMENTS

EP 0 390 734 B1 8/1990
JP S61-97795 5/1986

(Continued)

OTHER PUBLICATIONS

BQ-150 Book Binder Brochure, Published prior to Aug. 18, 2008, 2 pages.

(Continued)

*Primary Examiner* — Tony G Soohoo
(74) *Attorney, Agent, or Firm* — Polster Lieder Woodruff & Lucchesi, L.C.

(57) ABSTRACT

Apparatus is disclosed for controlling the depth of a layer of a layer of adhesive on a peripheral surface of a rotary member (e.g., a wheel) for the application of the adhesive to an object. The apparatus comprises a heated reservoir containing a supply of hot melt adhesive maintained within a desired temperature range, where the rotary member is partially immersed in the adhesive and is rotated by a motor such that the as the rotary member is rotated up out of the peripheral surface of the rotary member has the layer of adhesive thereon. A computer controls system controls the motor such that the speed of the rotary member may be increased or decreased so as to vary the depth of the adhesive on the peripheral surface of the rotary member.

3 Claims, 3 Drawing Sheets

(56) References Cited

U.S. PATENT DOCUMENTS

| | | | |
|---|---|---|---|
| 3,130,303 A | * | 4/1964 | Dobbins ................ 118/688 |
| 3,333,568 A | * | 8/1967 | Przybilla ................ 118/429 |
| 3,532,363 A | | 10/1970 | Abildgaard et al. |
| 3,570,350 A | | 3/1971 | Fogg |
| 3,575,501 A | | 4/1971 | Rosenberg |
| 3,633,727 A | | 1/1972 | Brenner |
| 3,762,324 A | * | 10/1973 | Ivary ................ 101/350.4 |
| 3,788,270 A | * | 1/1974 | Blair ................ 118/667 |
| 3,797,362 A | | 3/1974 | Heckman |
| 3,862,553 A | * | 1/1975 | Schwemmer et al. ........ 68/15 |
| 3,888,150 A | | 6/1975 | Stroud |
| 3,905,531 A | | 9/1975 | Aspinwall |
| 3,925,126 A | | 12/1975 | Leatherman et al. |
| 3,925,926 A | | 12/1975 | Shigeo |
| 3,956,053 A | | 5/1976 | Staats |
| 3,957,287 A | | 5/1976 | Hall et al. |
| 3,973,787 A | | 8/1976 | Staats et al. |
| 3,982,744 A | | 9/1976 | Kraynak et al. |
| 4,075,726 A | | 2/1978 | Korsgaard |
| 4,111,152 A | * | 9/1978 | Sakamoto ................ 118/688 |
| 4,149,288 A | | 4/1979 | Sendor et al. |
| 4,182,259 A | * | 1/1980 | Garner et al. ................ 118/712 |
| 4,184,218 A | | 1/1980 | Hawkes |
| 4,289,330 A | | 9/1981 | Wiermanski |
| 4,296,294 A | | 10/1981 | Beckert et al. |
| 4,367,061 A | | 1/1983 | Wiholm |
| 4,420,282 A | | 12/1983 | Axelrod |
| 4,436,469 A | | 3/1984 | Kelly |
| 4,446,814 A | * | 5/1984 | Abendroth et al. ........ 118/694 |
| 4,484,501 A | | 11/1984 | Ramcke |
| 4,496,617 A | | 1/1985 | Parker |
| 4,507,037 A | | 3/1985 | Fenimore |
| 4,518,157 A | | 5/1985 | Stobb |
| 4,528,643 A | | 7/1985 | Freeny, Jr. |
| 4,556,353 A | | 12/1985 | Ehlermann |
| 4,586,461 A | * | 5/1986 | Noguchi et al. ............ 118/663 |
| 4,606,387 A | | 8/1986 | Weislogel et al. |
| 4,715,758 A | | 12/1987 | Stobb |
| 4,839,829 A | | 6/1989 | Freedman |
| 4,863,191 A | | 9/1989 | Termanis |
| 4,922,773 A | | 5/1990 | Ito |
| 4,923,351 A | | 5/1990 | Nishikawa |
| 5,006,396 A | | 4/1991 | VanBortel et al. |
| 5,009,138 A | | 4/1991 | Rettie |
| 5,108,244 A | | 4/1992 | Bellanca |
| 5,128,111 A | * | 7/1992 | Kuehnle ................ 118/422 |
| 5,137,409 A | | 8/1992 | Honegger |
| 5,213,461 A | | 5/1993 | Kalisher |
| 5,240,362 A | | 8/1993 | Nakayama et al. |
| 5,250,318 A | * | 10/1993 | Tooker ................ 427/8 |
| 5,259,285 A | | 11/1993 | Uchida |
| 5,295,775 A | | 3/1994 | Andjelic et al. |
| 5,304,050 A | | 4/1994 | Vismara |
| 5,340,155 A | | 8/1994 | Podosek |
| 5,345,045 A | | 9/1994 | Rohwedder |
| 5,350,268 A | | 9/1994 | Muller |
| 5,354,045 A | | 10/1994 | Boldrini et al. |
| 5,374,050 A | | 12/1994 | Prim |
| 5,417,535 A | | 5/1995 | Andjelic et al. |
| 5,465,213 A | | 11/1995 | Ross |
| 5,496,253 A | | 3/1996 | Snellman et al. |
| 5,536,044 A | | 7/1996 | Luhman et al. |
| 5,547,176 A | | 8/1996 | Williams et al. |
| 5,569,012 A | | 10/1996 | Kosasa et al. |
| 5,632,587 A | | 5/1997 | Coyette |
| 5,647,714 A | | 7/1997 | Lundberg |
| 5,647,715 A | | 7/1997 | Stolz |
| 5,660,515 A | | 8/1997 | Hartsoe |
| 5,724,075 A | | 3/1998 | Smith |
| 5,820,325 A | | 10/1998 | Hartsoe |
| 5,850,774 A | | 12/1998 | Naldi |
| 5,868,539 A | | 2/1999 | Rathert |
| 5,871,323 A | | 2/1999 | Clark |
| 5,874,812 A | | 2/1999 | Chang |
| 5,904,084 A | | 5/1999 | Weston |
| 5,924,349 A | | 7/1999 | Perazzolo |
| 5,988,620 A | | 11/1999 | Graushar |
| 6,012,367 A | | 1/2000 | Westra et al. |
| 6,012,840 A | | 1/2000 | Small, IV et al. |
| 6,012,890 A | | 1/2000 | Celorio Garrido |
| 6,017,027 A | | 1/2000 | Jaeger |
| 6,017,029 A | | 1/2000 | Bates et al. |
| 6,142,721 A | | 11/2000 | Marsh |
| 6,193,458 B1 | | 2/2001 | Marsh |
| 6,206,358 B1 | | 3/2001 | Yamaguchi et al. |
| 6,213,703 B1 | | 4/2001 | Garrido |
| 6,416,082 B1 | | 7/2002 | Gayoso |
| 6,460,843 B1 | | 10/2002 | Dim et al. |
| 6,827,783 B2 | * | 12/2004 | Okeshi et al. ................ 118/679 |
| 6,928,914 B2 | | 8/2005 | Marsh |
| 7,014,182 B2 | | 3/2006 | Marsh |
| 7,591,905 B2 | * | 9/2009 | Picard et al. ................ 118/663 |
| 7,869,757 B2 | * | 1/2011 | Hattori ................ 399/408 |
| 7,963,733 B2 | * | 6/2011 | Marsh ................ 412/37 |
| 1,003,679 A1 | | 9/2011 | Welch |
| 2006/0029445 A1 | | 2/2006 | Nakamura et al. |
| 2007/0035081 A1 | | 2/2007 | Kaneko et al. |
| 2007/0036637 A1 | | 2/2007 | Hata et al. |
| 2007/0045920 A1 | | 3/2007 | Yoshie et al. |
| 2007/0122256 A1 | | 5/2007 | Toyoizumi et al. |
| 2010/0080668 A1 | * | 4/2010 | Marsh ................ 412/4 |
| 2012/0018008 A1 | * | 1/2012 | Shin et al. ................ 137/386 |

FOREIGN PATENT DOCUMENTS

| | | |
|---|---|---|
| JP | 08034190 A | 2/1996 |
| JP | 08276683 A | 10/1996 |
| JP | 09076661 A | 3/1997 |
| JP | 10016431 A | 1/1998 |
| JP | 11105455 A | 4/1999 |
| JP | 11240670 A | 9/1999 |
| JP | 3672719 B2 | 7/2005 |
| WO | 9938707 | 8/1999 |
| WO | 00/03876 | 1/2000 |
| WO | 0066366 | 11/2000 |
| WO | 0245924 | 6/2002 |

OTHER PUBLICATIONS

Konica Minolta bizhub PRO C6500 Specification & Installation Guide, published prior to Aug. 18, 2008, 12 pages.

* cited by examiner

APPARATUS FOR AND A METHOD OF DETERMINING CONDITION OF HOT MELT ADHESIVE FOR BINDING OF A PERFECT BOUND BOOK

CROSS-REFERENCE TO RELATED APPLICATIONS

This application relates to and claims priority to U.S. Provisional Patent Application No. 61/287,484, filed on Dec. 17, 2009 and incorporates that applications by reference in its entirety.

STATEMENT REGARDING FEDERALLY SPONSORED RESEARCH OR DEVELOPMENT

Not Applicable.

BACKGROUND OF THE DISCLOSURE

As described in my U.S. patent application Ser. No. 12/543,342, herein incorporated by reference in its entirety, a perfect bound book comprises a book block having a plurality of text pages, one edge of which constitutes a spine. The book typically has a one piece cover of a stock heavier than the stock from which the text pages are printed. The cover has a center spine area that is adhesively bound to the spine of the book by a suitable adhesive (preferably a hot melt adhesive) that has been applied to the spine at an adhesive application station immediately prior to being brought into contact with the cover. As shown in FIGS. 6 and 9 of the above-identified U.S. patent application, the adhesive application station typically includes a heated reservoir in which a quantity of the desired hot melt adhesive is melted and contained. The adhesive is maintained at a suitable elevated temperature (e.g., up to about 400° F., depending on the adhesive). The adhesive application station has a rotary wheel or drum that is partially immersed in the liquid adhesive such that when the wheel is rotated about a horizontal axis, the periphery of the wheel will be coated with the adhesive such that when the spine of the book block is brought into engagement with the wheel and when the wheel is moved lengthwise along the spine (or when the spine is moved relative to the wheel), the adhesive will be transferred to the spine.

Because of this, the low density molecules in the adhesive are evaporated (boiled off) thus altering the chemistry and viscosity of the hot melt adhesive. This, in turn, changes the application and performance of the bind.

It has also been found that the viscosity of the adhesive is inversely proportional to the temperature of the mixture and inversely proportional to the amount of low density molecules in the mixture. Viscosity of the adhesive has an important bearing on the speed and height of the glue wave (as described in my above-noted U.S. patent application) to achieve a proper application of glue to the spine of the book block. As the level of low density molecules are reduced, it becomes more difficult to "wet" the spine of the book block because the more viscous adhesive has more surface tension, which inhibits the application of the adhesive to the spine. Of course, if the spine is not properly wetted by the liquid adhesive, the adhesion of the adhesive to the spine and the adhesive of the cover to the adhesive on the spine is diminished. This adversely affects the strength of the bind. Thus, replacement of the supply of adhesive in the heated reservoir required. Of course, when it becomes necessary to drain the old adhesive from the reservoir, to replace the adhesive with new adhesive, and to bring the new adhesive up to operating temperature, this requires the POD book publishing system to be out of service for up to about an hour.

It will be understood that for print on demand (POD) book publishing systems, such as disclosed in the above-identified U.S. patent application, books are not continuously produced, but rather are typically produced as they are ordered by customers. Accordingly, significant periods of time may pass between the time one book is produced and the next book has been ordered. Because it takes time to heat the adhesive in the reservoir (e.g., 30-45 minutes or more), the reservoir is typically maintained in its heated state such that a book may be immediately produced upon the system being commanded to print the next book. As further disclosed in the above-noted U.S. patent application, one preferred adhesive is adhesive HM8101 commercially available from Capital Adhesives of Mooresville, Ind. However, other hot melt adhesives may be used, depending on a number of factors. Typically, such hot melt adhesives are complex organic compounds and admixtures having a wide array of molecules of different molecular weights, and different temperature and vaporization characteristics. As these hot melt adhesives are maintained at their elevated application temperatures in the heated reservoir for extended periods of time, certain of the more volatile organic compounds will vaporize and outgas from the adhesive thus changing the makeup of the remaining adhesive. If sufficient amounts of the more volatile compounds are vaporized, the adhesive or binding characteristics of the remaining adhesive may be adversely affected, thus resulting in improper binding of the book. Thus, from time-to-time, it has been necessary to change the adhesive in the reservoir to insure that satisfactory binding will result.

However, it has been difficult to judge when the adhesive in the reservoir should be replaced with fresh adhesive. It will be understood that upon changing the adhesive, it may again take a considerable time to allow the new adhesive to be heated to its desired application temperature (e.g., about 30-45 minutes, or more), during which time the apparatus will be down unable to bind books. It will be appreciated that if the print on demand (POD) book publishing system is used to produce books in sufficient quantity, adhesive must be added to the reservoir on a regular basis such that the adhesive is not resident in the reservoir for extended periods and such that the adhesive characteristics of the adhesive may be maintained for extending periods of time such that it is not necessary to drain and replace the adhesive in the reservoir On the other hand, if the POD system is only used occasionally and if the adhesive remains heated in the reservoir for extended periods so that the POD system will be ready for use with little or no warm-up period, the quality of the adhesive in the reservoir may be degraded relative quickly, depending on the characteristics of the adhesive being used. Thus, it is only desirable to change the adhesive when the adhesive in the reservoir has degraded to the point where it will not satisfactorily bind books. However, there has been a long-standing problem for the operator of the POD system to know when it would be desirable to change the adhesive in the reservoir so as to maintain the quality of the bound books without having to unnecessarily change the adhesive, which will result in the POD apparatus being out of service.

SUMMARY OF THE DISCLOSURE

Apparatus is disclosed for monitoring and signaling when a hot melt adhesive contained in a heated adhesive reservoir should be changed so as to maintain the adhesive characteristics of the adhesive above a predetermined level. The apparatus comprises a heated reservoir containing a supply of hot melt adhesive maintained within a desired temperature range. A rotary member is at least partially immersed in the adhesive in the reservoir and is rotated by a motor. A computer controls system controls the operation of the motor, whereby the computer control system may operate the motor from time to time by decreasing the running current supplied to the motor and monitoring the running current at which the adhesive stalls the motor. The computer control system compares the running current supplied to the motor at which the motor stalls to a predetermined stall running current corresponding to a predetermined the viscosity level of the adhesive at which the adhesive exhibits a minimum level of binding characteristics so as to generate a signal to effect the changing of the adhesive in the reservoir. Alternatively, if the computer control system determines that the viscosity of the adhesive has increased above a predetermined amount, the computer control system may effect increasing the temperature of the adhesive in the reservoir so as to reduce the viscosity of the adhesive, which will, in turn, improve the wetability of the adhesive as it is applied to the spine of the book block thus improving the binding qualities of the adhesive. A method of determining when the temperature of the adhesive should be elevated or when the adhesive should be changed is also disclosed.

BRIEF DESCRIPTION OF THE DRAWINGS

Corresponding reference characters indicated corresponding parts throughout the several views of the drawings.

DESCRIPTION OF PREFERRED EMBODIMENTS

Figure 1:
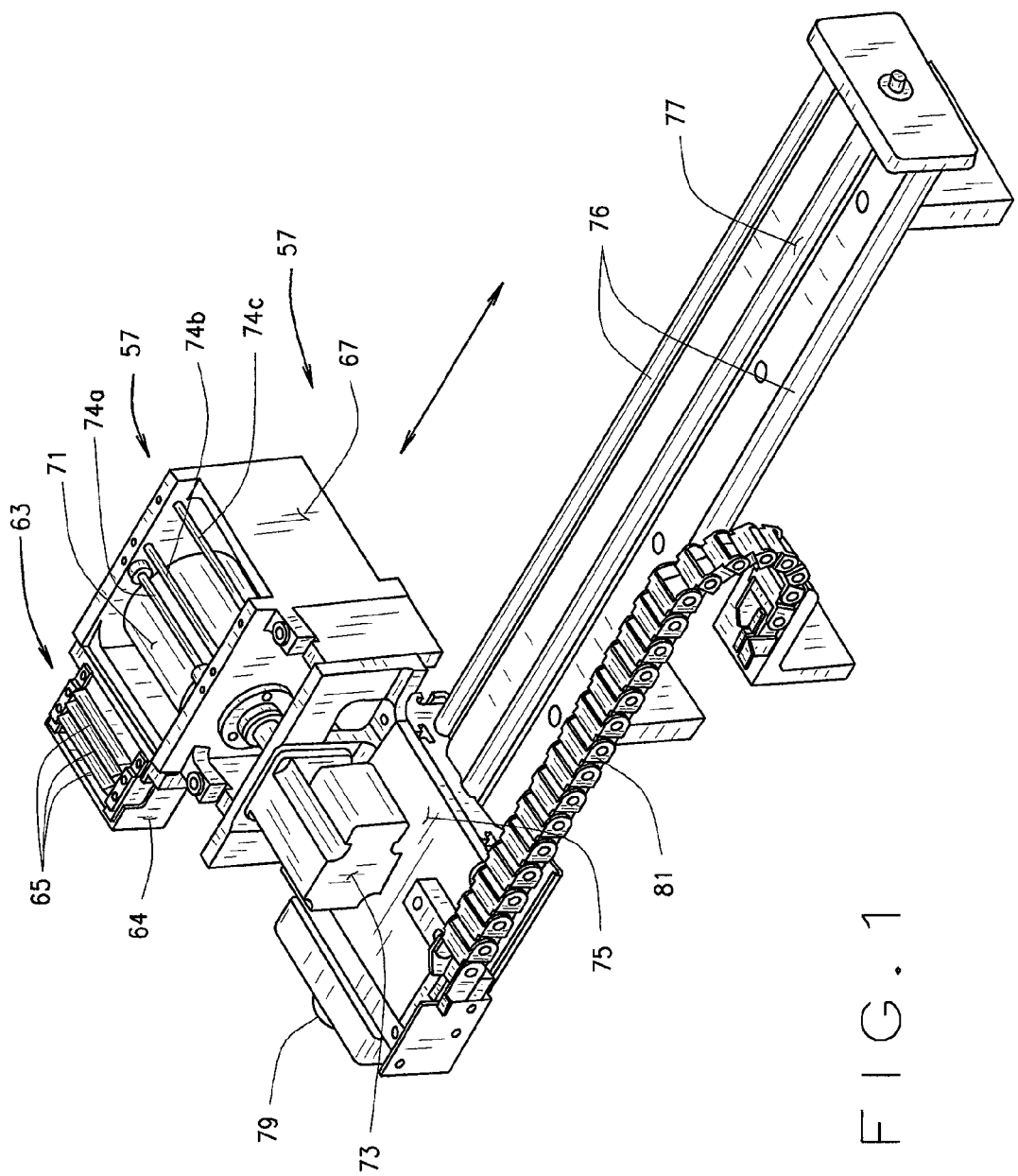
FIG. 1 is a perspective view of an adhesive application system of a print on demand (POD) book publishing and binding system having a heated adhesive reservoir in which an adhesive application wheel or drum is partially immersed in a reservoir of liquid hot melt adhesive and in which the wheel is rotated about a horizontal axis by a motor for application of the adhesive to the spine of a book block.
Figure 2:
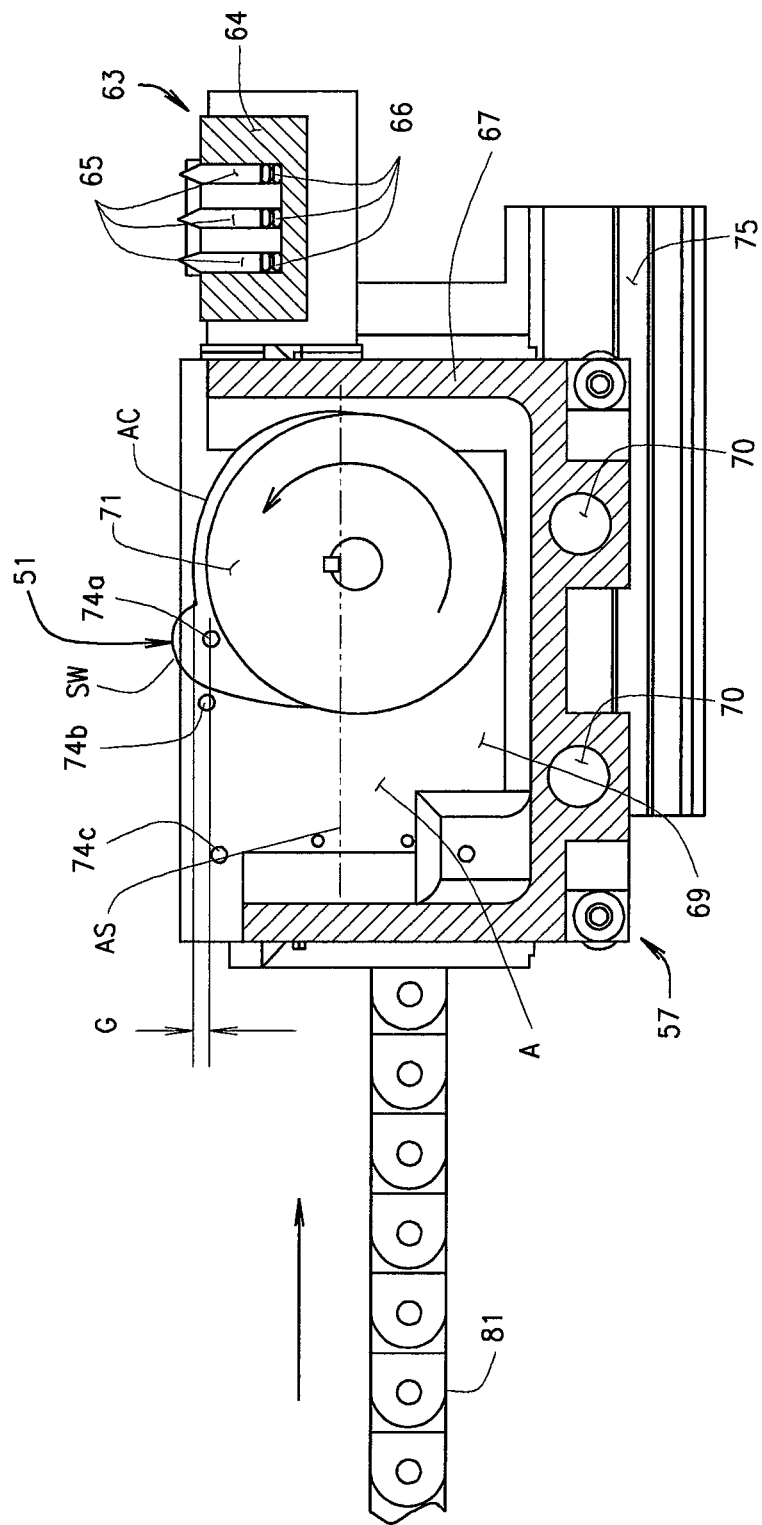
FIG. 2 is a vertical cross-sectional view of the adhesive application system illustrated in FIG. 1 showing details of the reservoir.
Figure 3:
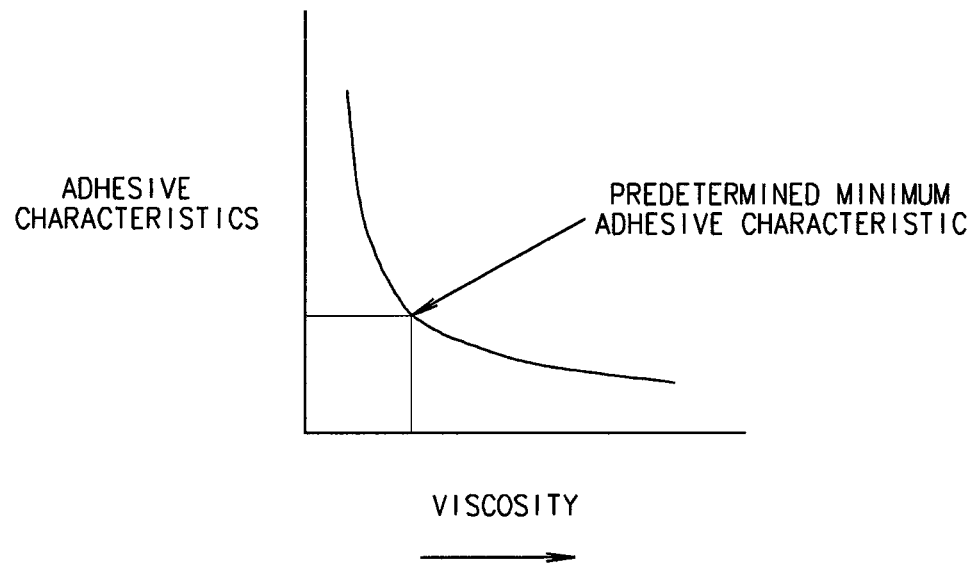
FIG. 3 is a graph plotting the adhesive characteristics of a particular adhesive heated to its desired operating temperature versus the viscosity, as represented by the operating current of the wheel motor.

Referring to FIG. 1, an adhesive application station for use with a print on demand (POD) book printing and publication system is shown. Such binding station and POD system is more fully disclosed in my U.S. patent application Ser. No. 12/543,343, filed Aug. 18, 2009, which is herein incorporated by reference in its entirety. FIGS. 1 and 2 of this disclosure correspond generally to FIGS. 6 and 9 of the above-identified application and the reference characters below 100 are the reference characters disclosed in the above-identified application. Here, certain features of the adhesive application station 57, as described in the above-identified application, will be herein described so as to give context to the present disclosure, but reference should be had to the above-identified application for a full description of the adhesive application station.

The adhesive application station 57 has a heated reservoir or glue pot, as indicated at 67. This glue pot is a receptacle of suitable heat conductive material, such as aluminum, and has a chamber or reservoir 69 therein for containing a supply of hot melt adhesive sufficient to bind a plurality of books (e.g., 10-50 books) without the necessity of adding additional adhesive to the reservoir. The reservoir 67 and the adhesive contained therein are heated to a desired predetermined temperature level by electric resistance heaters 70, which are under the control of a computer control system CS, such as described in my above-identified U.S. patent application. Depending on the particular adhesive selected, it may be desirable to heat and to maintain the adhesive at a relatively high elevated temperature (350-400° F.) to achieve the desired binding effect of the cover to the spine of the book block. As disclosed in my above-noted U.S. patent application, the operator of the POD book publishing system may manually add more adhesive to the reservoir from time to time so as to maintain a sufficient quantity of adhesive in the reservoir.

An adhesive application wheel or drum 71 is mounted within the reservoir for rotation about a horizontal axis with the wheel at least partially immersed in the heated, liquid adhesive in the reservoir. The wheel is rotated by an electric stepper motor 73 under the control of the computer control system CS. Preferably, motor 73 is a variable speed motor, such as a model IMS "Smart Motor" stepping motor (Model No. MDI1FRD23B7-EQ) commercially available from Intelligent Motion Systems, Inc. 370 North Main Street, Marlborough, Conn. 06447, or other similar motor. As shown in FIG. 2, the level of the adhesive in the reservoir, as indicated by the phantom line AS, may vary, but it is preferred that the level be maintained approximately about the level shown.

It has been observed that as the more volatile organic compounds (VOC) or lower molecular weight compounds are evaporated or driven off from the heated hot melt adhesive within reservoir 67, the viscosity of the remaining adhesive will increase. It has been further observed that the degradation of the binding characteristics of the hot adhesive in the reservoir is related to the viscosity of the heated adhesive such that as the viscosity increases, the binding characteristics of the adhesive decreases. It has been further determined that after the adhesive has resided in the reservoir for an extended period at its elevated operating temperature, the viscosity of the adhesive may be somewhat reduced by slighting raising the temperature of the adhesive, so as to makeup for the fact that some of the volatile organic compounds may have been lost. Thus, by raising the temperature of the adhesive in the reservoir even a slight amount (e.g., 10° F. or so), the viscosity and the wetability of the adhesive as it is applied to the spine may be improved. However, increasing the temperature of the adhesive even this slight amount will accelerate the rate at which the volatile compounds are driven off from the adhesive, but it is a way of extending the acceptable service life of the adhesive at least for a short time, which may be sufficient such that the changing of the adhesive may be deferred until a more convenient time.

It has also been observed that the viscosity of the adhesive in the reservoir may be determined by comparing the torque required to rotate wheel 71 by motor 73. The torque required to rotate wheel 71 is directly proportional to the amount of current required to operate the motor. Empirical testing must be used to develop the relationship between the viscosity of the adhesive versus the binding characteristics of the adhesive when the adhesive is heated to its desired operating temperature. Further, the point on the curve where unsatisfactory binding of the books will result must be empirically determined. Such a relationship is shown in FIG. 4.

Figure 4:
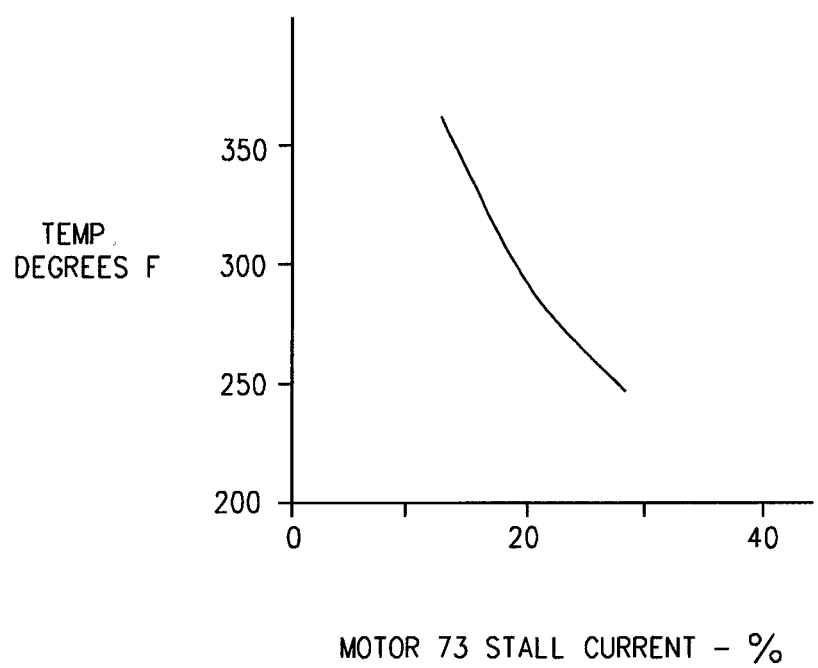
FIG. 4 is graph plotting the temperature of the adhesive in the reservoir versus the operating current of the wheel motor, which is indicative of the viscosity of the adhesive.

Still further, it has been determined that the viscosity of the adhesive is dependent on the temperature to which it is heated For one particular adhesive, such as adhesive HM8101 commercially available from Capital Adhesives of Mooresville, Ind., the stall current of motor 73 versus the operating temperature is shown in FIG. 4 and in the table below:

TABLE I

| Adhesive Temp. °F. | Stall Current % of Full Current |
|---|---|
| 350 | 14 |
| 325 | 16 |
| 300 | 19 |
| 285 | 21 |
| 270 | 25 |

This data is reflected in FIG. 4.

In accordance with this disclosure, during a period when the POD system is not making a book, the computer control system CS may be commanded to periodically (e.g., daily) operate motor 73 to rotate wheel 71 in such manner that the running current supplied to the motor is decreased until the motor stalls. The computer control system also monitors the temperature of the adhesive in the reservoir 67 to insure that the adhesive is within its desired operating temperature range. The computer control system then compares the running current supplied to motor 73 at which the motor stalls (referred to as the "stall" current) with the curve, such as shown in FIG. 4. It if the motor stalls at a running current at a certain viscosity level and if the adhesive characteristics of the adhesive are below a desired, predetermined level, the computer control system will generate a signal to the operator to replace the adhesive in the reservoir with fresh adhesive. In this manner, it is insured that the adhesive characteristics of the adhesive will satisfactorily bind the books being produced, but yet will not result in the unnecessary changing of the adhesive in the reservoir with a consequent out of service downtime for the POD apparatus.

Motor 73 is communicable with the computer control systems CS via a RS482 communications line wherein simple command codes can be issued to control the motor as well as query the status of the motor. Some of the commands of interest for this disclosure are "SL–slew", where the motor is told to start rotating in either a positive or negative direction "PR ER" or print error, where the motor will respond with an error code "RC" or run current where the amount of torque generated by the motor can be controlled as a percentage of the full current torque capability. Thus, by knowing the current supplied to the motor, the resistance of the adhesive on the wheel 71 is known and thus the relative viscosity of the adhesive can be determined as a function of the current required to rotate the wheel.

Thus, at times when a book is not being fabricated, a software routine can be executed by the computer control system CS. First, the controlling program queries a temperature controller, which regulates the temperature of the reservoir to determine the current temperature of the adhesive. The motor is then issued a command "RC 100" to put the motor at full torque. Then the motor is issued "SL–5000" which instructs the motor to rotate in the negative direction at, for example, 5000 steps per second. This instruction is shown as an example and may change due to the then current construction of the glue pot and drive train. After the motor has come to speed (perhaps one second) the software issues a "PR ER" and awaits the return response from the motor. If the motor issues a response of "0," there is not error and the motor is performing as instructed. Receiving the "0," the software routine then issues a "RC 95" to reduce the torque of the motor and after allowing a response time (perhaps 2 seconds); another "PR ER" is issued. This sequence is continued until such time the motor is no longer able to rotate the wheel in the viscous fluid and responds to the query with an error (86—stall reached) Then, knowing the temperature and the speed/current at which the motor can no longer rotate (such as shown in FIG. 4 or depicted in Table I), the table can be addressed to allow the software to decide either to increase the temperature of the glue pot (to a preset upper limit) or to alert the operator that the glue must be replaced.

Further, by periodically determining the viscosity of the adhesive, as described above, once the viscosity increases to a point where the binding capability of the adhesive begins to decrease below a predetermined level (as was empirically determined for that particular adhesive), the temperature of the adhesive may be elevated so as to decrease the viscosity of the adhesive. This may, for at least a while, lower the viscosity of the adhesive to the point where it will sufficient wet the spine and will satisfactorily bind the spine to the cover. When, even at the elevated operating temperature, the viscosity of the adhesive exceeds a predetermined amount, the binding characteristics of the adhesive will have degraded to the point where it is necessary that the adhesive in the reservoir be changed so that "fresh" adhesive is present in the reservoir.

In addition, it will be appreciated that the computer control system CS can monitor the current supplied to motor 73 so as to maintain operation of the motor at a predetermined operating speed if the viscosity of the adhesive in the reservoir increases, either due to a decrease in the temperature of the adhesive or due to an increase in the viscosity of the adhesive due to the volatile organic compounds being boiled off on account of the adhesive remaining in the reservoir and being held at its elevated operating temperature for an extended period of time. By insuring that the motor speed is so maintained, the application of adhesive to the spine S of the book block BB will also be maintained.

Still further, by knowing the speed of the motor and the temperature to which the adhesive in the reservoir is heated, and by determining the viscosity of the adhesive as by monitoring the operating current supplied to motor 73 to maintain the speed of the motor, the height of the standing wave SW shown in FIG. 9 of my U.S. patent application Ser. No. 12/543,342 can be varied so as to insure that it is of a predetermined minimum height. This in turn insures that the standing wave presents a sufficient "target" for the spine of the book block so as to insure that adequate adhesive is applied to the spine. It will further be noted that the height of the standing wave SW can also be controlled to be of a predetermined minimum height by installing a sensor S1 on reservoir 67 to detect when the height of the standing wave SW meets or exceeds a predetermined minimum height. For example, a model SSF-OP-OA fiber amplifier photocell commercially available from www.AutomationDirect.com of Cummings, Ga. may be installed on the reservoir proximate the top of wheel 71 to shoot a beam across the wheel, which beam would be blocked by the standing wave once it met or exceeded its predetermined minimum height. Of course, if the standing wave is insufficiently high to break the beam of the sensor S1, computer control system CS will command motor 73 to speed up so as to increase the height of the standing wave until the standing wave breaks the beam of sensor S1, at point the speed of the motor will remain constant to maintain the height of the wheel. Further, the temperature of the adhesive in the adhesive reservoir may be regulated to as to optimize the wetting capability of the adhesive and to adjust or regulate the wave height.

In addition, an Automation Direct SSF-ON-OE fiber photoelectric amplifier with CF-RBA-20 thru-beam optical fibers and the appropriate lenses were used with the above-described photocell to detect and control the height of the wave SW This allowed a 15 inch (0.38 m.) span across the wave bar to keep the heat away from the fibers. In practice, the fibers should be on the opposite side of the glue pot parking position to reduce vapor deposition on the lenses and to reduce excess heat build-up. With the thru-beam, it is possible precisely adjust the glue wave to a desired height by varying the rotational speed of stepper motor 73. The beam is sensitive enough to discern a rotation rate change of +/−5 steps per second (sps) of the speed of motor 73.

TABLE II

| Temperature - Degrees F. | Rotational Speed Of Wheel To Achieve Wave Height (sps) |
|---|---|
| 275 | 39 |
| 300 | 59 |
| 325 | 89 |
| 350 | 130 |

These rotational speed numbers are arbitrary numbers simply to illustrate the control that the above-described thru-beam wave height sensing system can achieve to obtain and maintain the optimum glue wave height. In practice, the wave height, temperature and total drum speed have to be optimized to assure adequate flow is maintained in regards to the velocity of the spine across the wave. However, with the addition of the thru-beam sensing, both the glue on the wheel 71, the height of the can be even further characterized and controlled. In this manner, the operator of the apparatus can be alerted for any of the following operating parameters of the adhesive: 1.) a too low glue level situation; 2.) the glue being too degraded and to automatically optimize the system within certain limits; or 3.) compensating for inconsistent addition of replenishment glue.

This invention is useful in that it will improve the consistency and quality of the bind and will reduce the service diagnostics related to glue reaching its end of life due to excessive heating without use.

As various changes could be made in the above constructions without departing from the broad scope of the invention, it is intended that all matter contained in the above description or shown in the accompanying drawings shall be interpreted as illustrative and not in a limiting sense.

The invention claimed is:

1. Apparatus configured to vary an amount of a hot melt adhesive carried a peripheral surface of a rotating adhesive application wheel which is partially immersed in a reservoir of liquefied hot melt adhesive, said apparatus comprising a motor for rotating said wheel about an axis, and a computer control system for controlling the operation of said motor, wherein as said wheel rotates up out of said adhesive in said reservoir a layer of adhesive is formed on said peripheral surface of said wheel for application to an object, and a sensor for sensing the depth of said layer of adhesive on said peripheral surface of said wheel, said computer control system being responsive to said sensor for varying the speed of said motor so as to adjust the depth of said layer of adhesive, said apparatus further comprising a temperature sensor for monitoring the temperature of said adhesive in said reservoir, said computer control system being further responsive to the temperature of said adhesive in said reservoir so as to control the speed of said motor so as to vary the depth of said layer of adhesive on said wheel.

2. Apparatus as set forth in claim 1 wherein said layer of adhesive includes a standing wave of adhesive formed on the periphery of said wheel, a sensor for determining the height of said standing wave, and wherein said computer control system is responsive to said height sensor so as to vary the speed of said wheel so as to vary the height of said standing wave.

3. Apparatus as set forth in claim 1 wherein said layer of adhesive includes a standing wave of adhesive formed on the periphery of said wheel, and wherein said apparatus further comprises a heater for heating said adhesive in said reservoir, a sensor for sensing the temperature of said adhesive in said reservoir and for communicating the temperature of the adhesive in the reservoir to said computer control system, said computer control system being responsive to the temperature of said adhesive in said reservoir for varying the temperature of said adhesive so as to vary the height of said standing wave.

* * * * *